(12) United States Patent
Kato et al.

(10) Patent No.: US 12,071,081 B2
(45) Date of Patent: Aug. 27, 2024

(54) WIRE HARNESS ROUTING DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hirotaka Kato, Mie (JP); Satoshi Yamamoto, Mie (JP); Kazuyoshi Ohara, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 297 days.

(21) Appl. No.: 17/610,202

(22) PCT Filed: Apr. 28, 2020

(86) PCT No.: PCT/JP2020/018082
§ 371 (c)(1),
(2) Date: Nov. 10, 2021

(87) PCT Pub. No.: WO2020/230621
PCT Pub. Date: Nov. 19, 2020

(65) Prior Publication Data
US 2022/0219628 A1    Jul. 14, 2022

(30) Foreign Application Priority Data
May 14, 2019    (JP) .................................. 2019-091341

(51) Int. Cl.
*B60R 16/02*       (2006.01)
*B60N 2/07*        (2006.01)
(Continued)

(52) U.S. Cl.
CPC ............ *B60R 16/0215* (2013.01); *B60N 2/07* (2013.01); *H02G 3/0462* (2013.01); *H02G 11/02* (2013.01)

(58) Field of Classification Search
CPC ...... H02G 11/00; H02G 11/02; H02G 11/006; H02G 3/0475; F16G 13/16; B60R 16/02; B60R 16/0215; B60R 16/027
See application file for complete search history.

(56) References Cited

U.S. PATENT DOCUMENTS 6,328,243 B1* 12/2001 Yamamoto ............. H02G 11/02
                                                  242/378.1
7,900,863 B1*  3/2011 Cheng .................. B65H 75/4434
                                                  242/378.1
(Continued)

FOREIGN PATENT DOCUMENTS

JP    S57-177328 U    11/1982
JP    2004-136735 A    5/2004
(Continued)

OTHER PUBLICATIONS

International Search Report issued on Jul. 7, 2020 for WO 2020/230621 A1 (4 pages).

*Primary Examiner* — Paresh Paghadal
(74) *Attorney, Agent, or Firm* — Venjuris, P.C.

(57) ABSTRACT

Provided is a wire harness routing device that includes a rail in which an insertion hole through which a wire harness is to be inserted is formed, and a slider that performs a sliding movement together with the wire harness with respect to the rail, the wire harness routing device including a harness regulating portion that is arranged along the wire harness in (Continued)

the insertion hole, and is configured to regulate the movement of the wire harness in a direction different from a direction of performing the sliding movement, and move in the insertion hole accompanying the sliding movement of the slider.

5 Claims, 7 Drawing Sheets

(51) Int. Cl.
  *H02G 3/04* (2006.01)
  *H02G 11/02* (2006.01)

(56) References Cited

U.S. PATENT DOCUMENTS

| | | | | |
|---|---|---|---|---|
| 2011/0114779 A1* | 5/2011 | Tsubaki | ……………… | H02G 11/02 |
| | | | | 242/372 |
| 2014/0062186 A1* | 3/2014 | Tsubaki | ……………… | H02G 11/02 |
| | | | | 307/10.1 |
| 2020/0099205 A1* | 3/2020 | Yamamoto | ………… | B60N 2/0264 |

FOREIGN PATENT DOCUMENTS

| | | | | |
|---|---|---|---|---|
| JP | 2013-049402 A | 3/2013 | | |
| JP | 2016-220518 A | 12/2016 | | |
| JP | 2017-093015 A | 5/2017 | | |
| JP | 2017-093016 A | 5/2017 | | |
| KR | 100922345 B1 * | 10/2009 | ………… | F16G 13/16 |

* cited by examiner

WIRE HARNESS ROUTING DEVICE

CROSS REFERENCE TO RELATED APPLICATIONS

This application is a national phase of PCT application No. PCT/JP2020/018082, filed on 28 Apr. 2020, which claims priority from Japanese patent application No. 2019-091341, filed on 14 May 2019, all of which are incorporated herein by reference.

TECHNICAL FIELD

The present specification discloses a technique relating to a wire harness routing device.

BACKGROUND

Conventionally, vehicles such as automobiles are provided with slidable seats, and these seats are equipped with electrical components such as an electric reclining device and a seat heater. Since a wire harness that connects these electrical components and devices or the like on the vehicle body side follows the sliding of the seat between the seat and the vehicle body, a configuration for absorbing the extra length of the wire harness is provided between the seat and the vehicle body. In Patent Document 1, a wire harness covered by a seat leg and a protector is slidably accommodated in a side space partitioning the inside of a seat rail under the seat. An extra-length absorption box is arranged at a position adjacent to the side portion of the seat rail, and the extra length portion of the wire harness when the seat leg slides is accommodated in the extra length absorption box in a state of being folded over in a U shape.

PRIOR ART DOCUMENT

Patent Document

Patent Document 1: JP 2013-049402 A

SUMMARY OF THE INVENTION

Problems to be Solved

Incidentally, in the configuration in which the wire harness is arranged in the rail for sliding the seat, there is concern that if the wire harness in the rail deviates from a predetermined routing path, the extra length portion of the wire harness will not be properly accommodated in the extra-length absorption box and thus the smooth sliding of the seat will be hindered. In Patent Document 1, the routing path of the wire harness in the seat rail is regulated by forming the side space in the seat rail, but if the side space is formed in the seat rail, there is a problem in that the internal shape of the seat rail will become complicated, and the space in the seat rail cannot be used efficiently.

Means to Solve the Problem

The wire harness routing device described in the present specification is a wire harness routing device including a rail in which an insertion hole through which a wire harness is to be inserted is formed, and a slider configured to perform a sliding movement together with the wire harness with respect to the rail, the wire harness routing device including a harness regulating portion that is arranged along the wire harness in the insertion hole, and is configured to regulate movement of the wire harness in a direction different from a direction of performing the sliding movement, and move in the insertion hole accompanying the sliding movement of the slider.

Effect of the Invention

According to the technique described in the present specification, it is possible to regulate the routing path of a wire harness in a rail.

DETAILED DESCRIPTION TO EXECUTE THE INVENTION

Description of Embodiments of Present Disclosure

First, embodiments of the present disclosure will be listed and described.

(1) The wire harness routing device of the present disclosure is a wire harness routing device including a rail in which an insertion hole through which a wire harness is to be inserted is formed, and a slider configured to perform a sliding movement together with the wire harness with respect to the rail, the wire harness routing device including a harness regulating portion that is arranged along the wire harness in the insertion hole, and is configured to regulate movement of the wire harness in a direction different from a direction of performing the sliding movement, and move in the insertion hole accompanying the sliding movement of the slider.

According to the above configuration, the harness regulating portion can regulate the routing path of the wire harness in the rail. Also, since the harness regulating portion moves in the insertion hole accompanying the movement of the slider, it is possible to suppress a case in which the harness regulating portion becomes an obstacle to the movement of the slider.

(2) The harness regulating portion is elastically deformable in response to the movement of the slider, and an end portion of the harness regulating portion is fixed to the slider side.

In this manner, with a simple configuration, it is possible to regulate the routing path of the wire harness and suppress a case in which the harness regulating portion becomes an obstacle to the movement of the slider due to elastic deformation.

(3) A winding portion configured to wind the harness regulating portion is provided outside of the rail.

In this manner, the harness regulating portion can be accommodated on the outside of the rail with a simple configuration.

(4) An extra-length accommodation portion in which an extra length portion of the wire harness led out to the outside of the rail is accommodated is included, in which the wire harness is wound in a spiral shape with two or more turns in the extra-length accommodation portion.

In this manner, since the wire harness is accommodated in the extra-length accommodation portion in a spiral shape, for example, the length of the extra-length accommodation portion can be shortened compared to the configuration in which the wire harness is accommodated in a state of being folded over in a U shape in a long accommodation box.

(5) The wire harness includes a plurality of electric wires and an outer body for accommodating the plurality of electric wires, and the outer body is inserted through the rail in an orientation in which a vertical direction is longer than a width direction, and the harness regulating portion suppresses the wire harness from falling over.

If the wire harness is inserted into the rail in an orientation in which the vertical direction is longer than the width direction, the outer diameter of the portion where the path of the wire harness bends can be reduced and a smaller size can be achieved compared to the configuration in which the vertical direction is shorter than the width direction, but there is a problem in that the wire harness has a vertically elongated shape and easily falls over. According to the present configuration, even if the configuration is such that the wire harness easily falls over due to the orientation of the wire harness for achieving a smaller size, the harness regulating portion can suppress the wire harness from falling over.

DETAILED DESCRIPTION OF EMBODIMENTS OF DISCLOSURE

Specific examples of the substrate, component mounting substrate, and electrical connection box of the present disclosure will be described below with reference to the drawings. It should be noted that the present disclosure is not limited to these examples, but is indicated by the scope of claims, and is intended to include all modifications within the meaning and scope equivalent to the claims.

EMBODIMENT

An embodiment will be described with reference to FIGS. 1 to 7.

A wire harness routing device 10 of the present embodiment is fixed on a floor under a seat 60 in a vehicle such as an automobile (not shown), and a wire harness 11 connected to an electrical component of the seat 60 is routed therein. Hereinafter, the X direction in FIG. 1 will be described as frontward, the Y direction as leftward, and the Z direction as upward.

Figure 1:
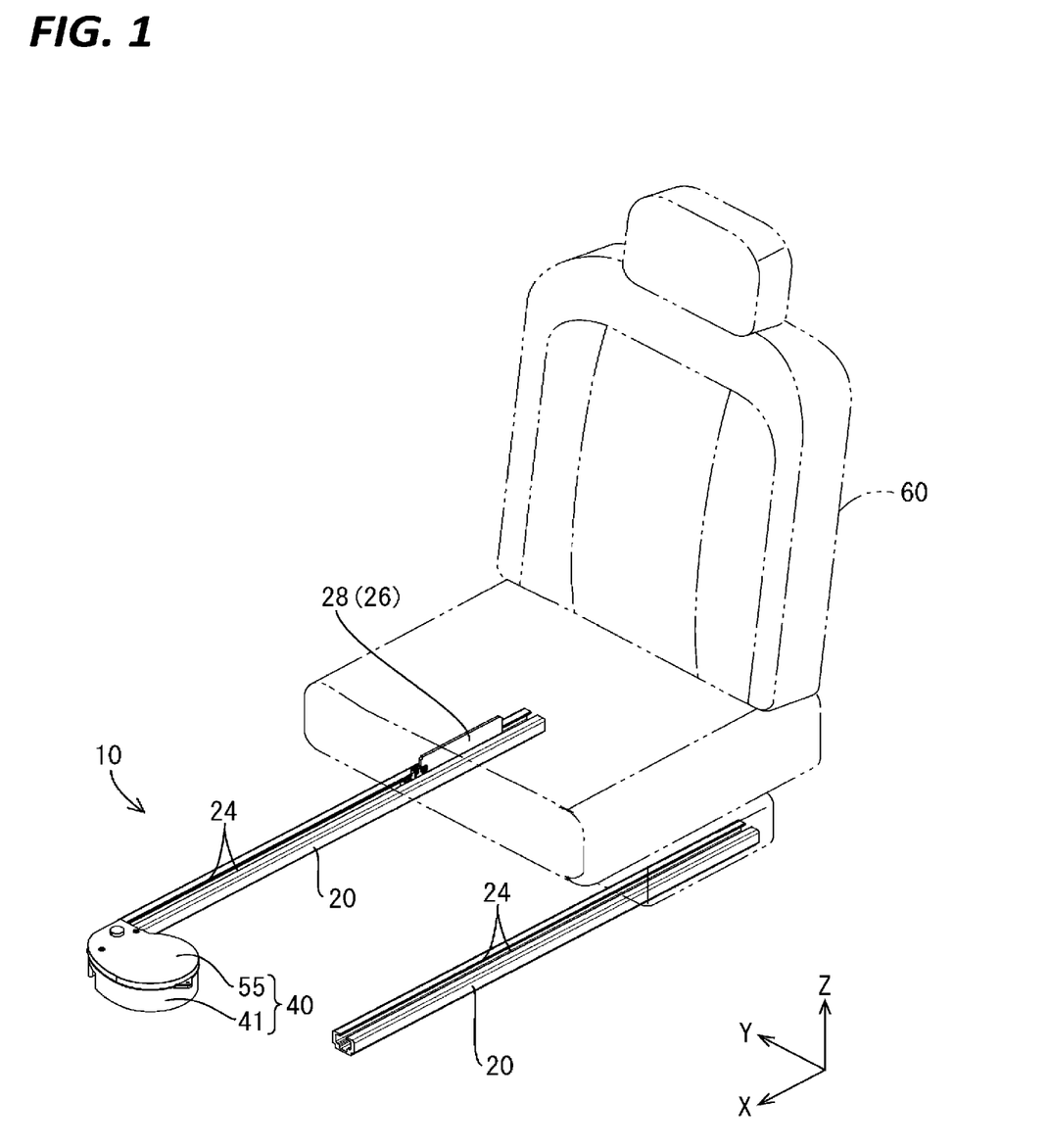
FIG. 1 is a perspective view showing a harness routing device according to an embodiment.

As shown in FIG. 1, the seat 60 is slidable in the front-rear direction with respect to rails 20 fixed on the floor of a passenger compartment of a vehicle body (not shown) by bolting or the like. The seat 60 is provided with various electrical components such as an electric reclining device, a seat heater, a sensor for detecting whether or not an occupant is in the seat, and a sensor for detecting whether or not a seatbelt is worn. The lower portion of the seat 60 is fixed to sliders 26 in the rails 20 (only the slider 26 of one rail 20 is shown in FIG. 1, and the slider of the other rail 20 is omitted).

Wire Harness 11

The wire harness 11 is routed on the floor (under a mat, panel, etc.) or under the floor of the vehicle body, and is connected to a device such as an ECU (Electronic Control Unit) on the vehicle body side. Power is supplied and signals are transmitted and received between the device on the vehicle body side and the electrical components of the seat 60 via the wire harness 11.

Figure 3:
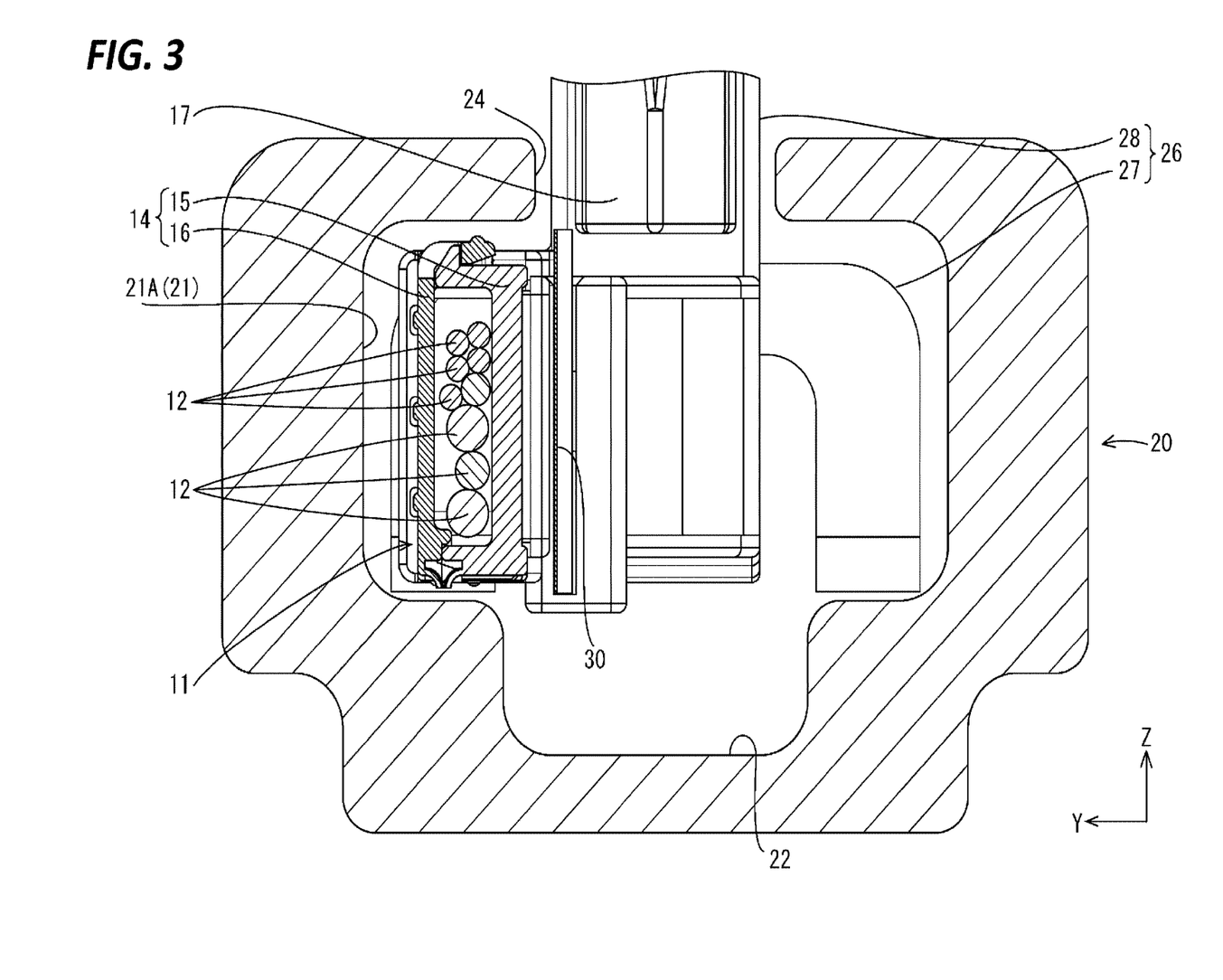
FIG. 3 is a cross-sectional view taken along line A-A in FIG. 2.

The wire harness 11 routed between the seat 60 and the vehicle body is inserted into (routed in) the rail 20 under the seat 60. As shown in FIG. 3, the wire harness 11 includes a plurality of electric wires 12 (nine in the present embodiment) and an outer body 14 that collectively accommodates the plurality of electric wires 12. Each electric wire 12 is a covered electric wire in which a metal conductor portion is covered with an insulating layer, and is connected to the various electrical components of the seat 60.

The outer body 14 is made of, for example, an insulating synthetic resin, and extends in a band shape in the front-rear direction in a state of surrounding the plurality of electric wires 12, which are aligned vertically. The outer body 14 includes a band-shaped outer main body 15 extending along the plurality of electric wires 12 and a band-shaped outer cover 16, and the outer body 14 is curved only to one side (the extra-length accommodation portion 40 side) in the left-right direction due to a large number of slit-shaped notches 15A (see FIG. 6) being formed side by side in the outer body 15. It should be noted that the wire harness 11 routed outside of the rail 20 and the extra-length accommodation portion 40 is routed in a state in which the plurality of electric wires 12 are not covered by the outer body 14.

Wire Harness Routing Device 10

Figure 2:
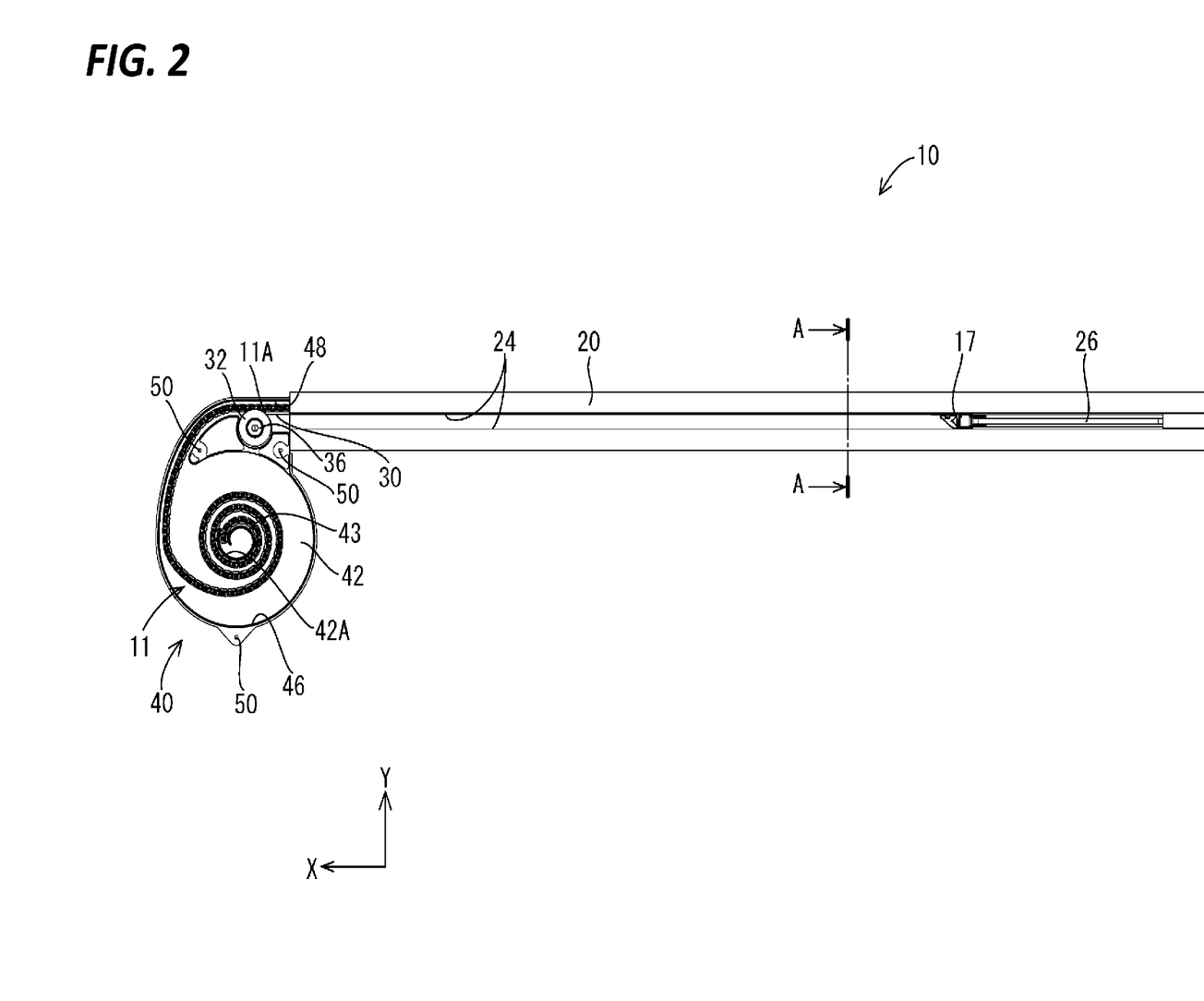
FIG. 2 is a plan view showing a harness routing device in a state in which a slider is arranged on the rearward side of a rail.
Figure 4:
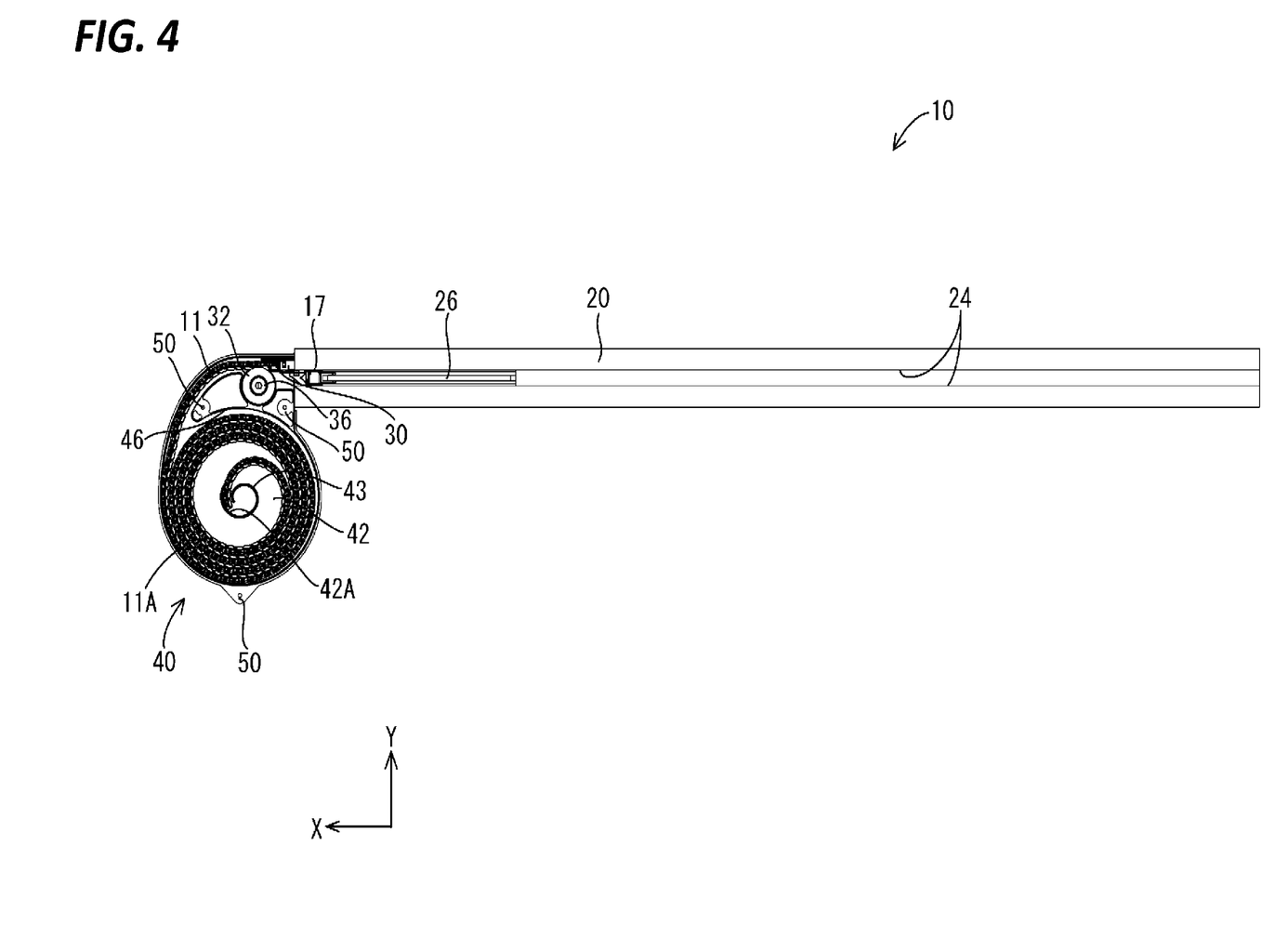
FIG. 4 is a plan view showing the harness routing device in a state in which the slider is arranged on the frontward side of the rail.

As shown in FIGS. 2 and 4, the wire harness routing device 10 includes a rail 20, a slider 26 slidably arranged in the rail 20, a harness regulating portion 30 that regulates the routing path of the wire harness 11, and an extra-length accommodation portion 40 in which the extra length portion 11A of the wire harness 11 is accommodated.

Rail 20

The rail 20 is made of metal, and as shown in FIG. 1, a pair of rails 20 are provided for each seat 60 and extend linearly in the front-rear direction. As shown in FIG. 3, each rail 20 has an insertion hole 21 through which the slider 26 is inserted, and which is formed through in the front-rear direction. The insertion hole 21 has a rectangular shape that is longer in the left-right direction, and a bottom groove 22 having a reduced width dimension on the downward side extends in the front-rear direction. Above the insertion hole 21, a through groove 24 that communicates with the outside extends in a groove shape in the front-rear direction.

Slider 26

Figure 5:
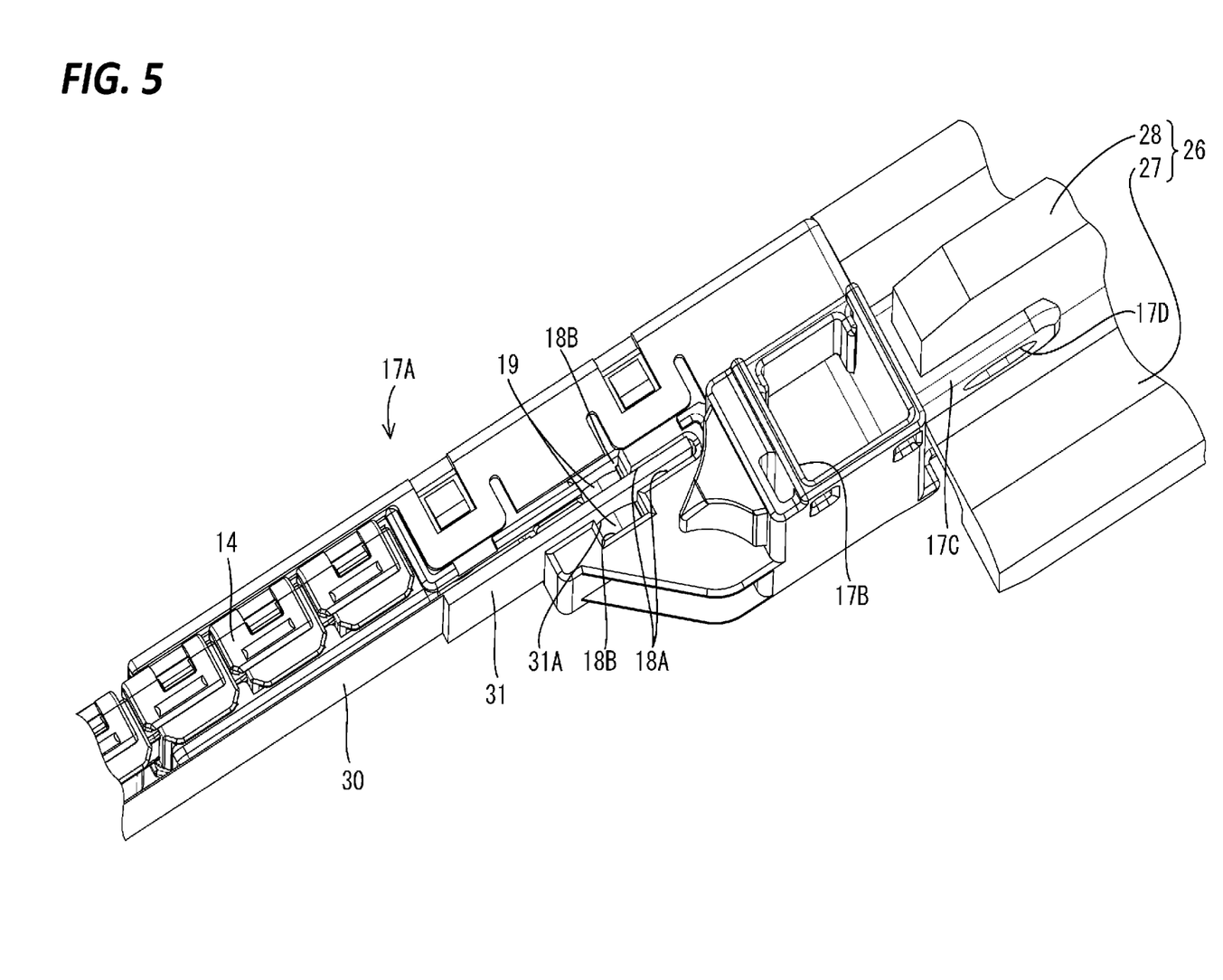
FIG. 5 is a perspective view showing a state in which a guide member is fixed to the slider.

The slider 26 is made of, for example, a synthetic resin or a metal, and is slidable in the front-rear direction with respect to the rail 20, and includes a slider main body 27 arranged in the insertion hole 21 and an attachment portion 28 that protrudes upward in the form of a plate from the upper surface of the slider main body 27. The width of the slider main body 27 is larger than the interval of the through groove 24. The attachment portion 28 slides between notches formed in the mat or the like on the floor, and is fastened to an attached portion (not shown) of the seat 60 by a fastening member (not shown) such as a bolt. Also, as shown in FIG. 5, a tubular guide member 17 through which a plurality of electric wires 12 are inserted is provided in front of the slider 26, and a pair of extended attachment portions 17C that are extended rearward of the guide member 17 are fixed to the attachment portion 28. A through hole 17D is formed through each of the extended attachment portions 17C, and a shaft portion of a bolt serving as a fastening member is inserted through a fastening hole (not shown) and the through hole 17D formed through the attachment portion 28, and is fastened with a nut. The guide member 17 is made of a synthetic resin, and includes an outer body fixing portion 17A that is connected to the rear end portion of the outer body 14 to position the outer body 14, an outlet 17B from which the plurality of electric wires 12 are guided upward, an insertion groove 18A into which a metal fixing plate 31 at the rear end portion of the harness regulating portion 30 is inserted, and a pair of fixing member accommodation chambers 18B in which a fixing member 19 is accommodated. The plurality of electric wires 12 extend rearward from the rear end portion of the outer body 14 behind the outer body fixing portion 17A inside the guide member 17.

The fixing member 19 has a circular columnar shape, and is made of, for example, a metal such as aluminum, an aluminum alloy, copper, a copper alloy, or iron, or a synthetic resin, has the same outer peripheral shape as a fixing hole 31A, and is press-fit into the fixing hole 31A of the metal fixing plate 31 to fix the position of the metal fixing plate 31 (rear end portion of the harness regulating portion 30). It should be noted that the fixing member 19 is not limited to this, and for example, the fixing member may be constituted by a bolt having a head portion that is larger than the fixing hole 31A and a nut having an outer diameter that is larger than that of the fixing hole 31A, and the shaft portion of the bolt may be fastened by the nut in a state in which the shaft portion is inserted into the fixing hole 31A of the metal fixing plate 31. The insertion groove 18A has a gap with a predetermined dimension. The fixing member accommodation chambers 18B are provided in the middle portion in the front-rear direction of the insertion groove 18A, form a space into which the fixing member 19 can be inserted, and regulates movement in the front-rear direction of the fixing member 19 accommodated in the fixing member accommodation chambers 18B.

Harness Regulating Portion 30

The harness regulating portion 30 is a thin, elastically-deformable leaf spring made of a band-shaped metal such as copper, a copper alloy, aluminum, or an aluminum alloy, and extends in the front-rear direction along the wire harness 11 in the insertion hole 21. The leaf spring is bent with a constant curvature in the natural state, and the return force (load) generated when the leaf spring is stretched in a straight line is constant. As shown in FIG. 5, in the harness regulating portion 30, a metal fixing plate 31 made of a metal thicker than the leaf spring is overlaid on the leaf spring at the rear end portion (one end side), and the metal fixing plate 31 is fixed to the leaf spring through a fixing means such as welding. The circular fixing hole 31A is formed through the metal fixing plate 31, and the fixing member 19 press-fit into the fixing hole 31A is locked to the guide member 17, whereby the harness regulating portion 30 moves in the insertion hole 21 accompanying the sliding movement of the slider 26.

Figure 6:
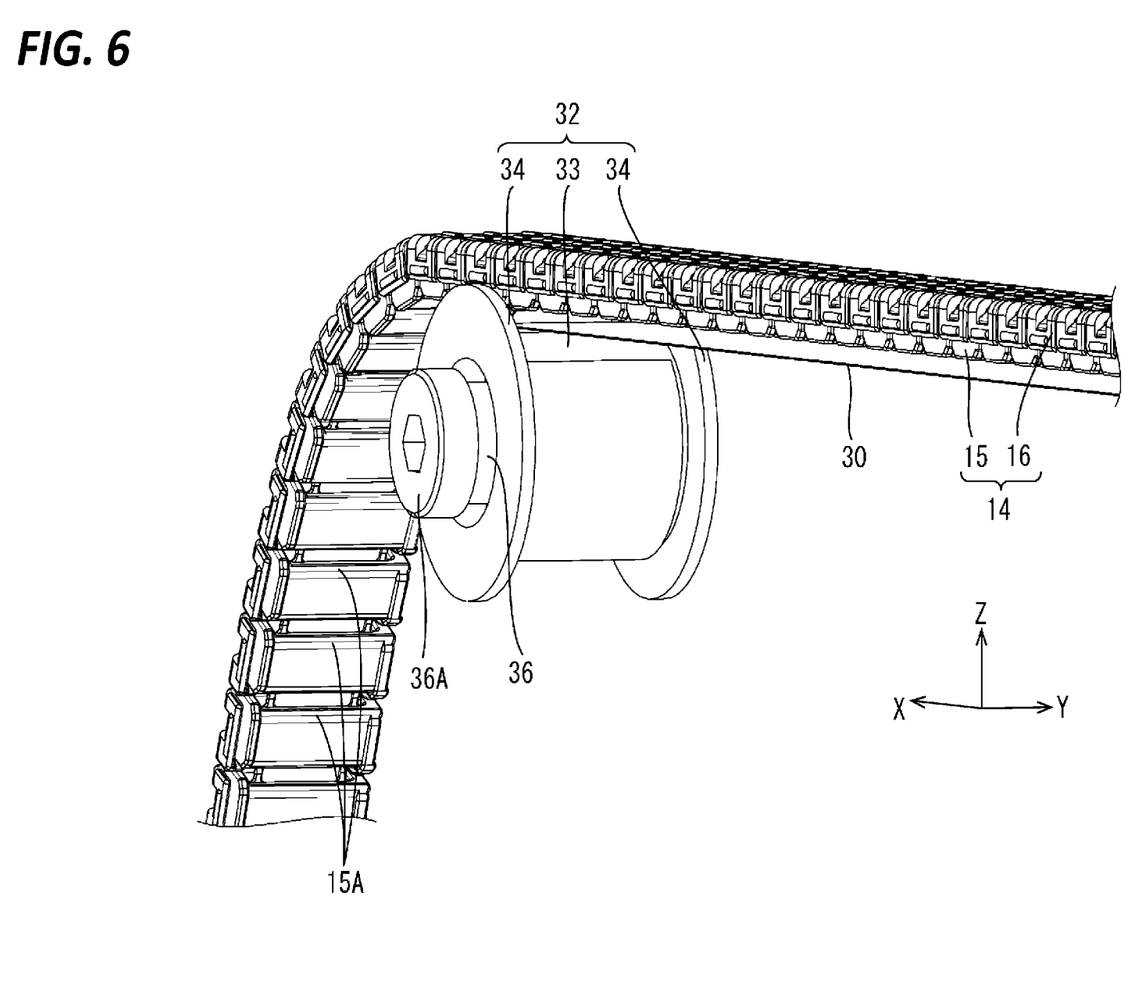
FIG. 6 is a perspective view showing a state in which a harness regulating portion is wound around a winding portion.

As shown in FIG. 6, the front end side (other end side) of the harness regulating portion 30 is wound around a winding portion 32 arranged outside of the rail 20. Since the harness regulating portion 30 extends along the wire harness 11 in the vicinity of the wire harness 11, the harness regulating portion 30 regulates movement (positional misalignment) in the vertical direction and the left-right direction of the wire harness 11 in the rail 20.

The winding portion 32 includes a cylindrical tubular portion 33 around which the harness regulating portion 30 is wound, and a pair of overhang portions 34 that project from the edge portion of the tubular portion 33 in a brim shape. The harness regulating portion 30 is elastically deformed and wound around the outer periphery of the tubular portion 33 between the pair of overhang portions 34. For example, a support shaft portion 36 fixed to the floor of the vehicle or the extra-length accommodation portion 40 is inserted into the tubular portion 33. The support shaft portion 36 is circular column-shaped and has an outer diameter smaller than the inner diameter of the tubular portion 33, a head portion 36A with an outer diameter larger than the inner diameter of the tubular portion 33 is formed on the leading end portion of the support shaft portion 36, and the detachment of the winding portion 32 is regulated by this head portion 36A. The winding portion 32 can rotate with respect to the support shaft portion 36, and when the wire harness 11 and the harness regulating portion 30 slide in the same direction as the seat 60 accompanying the sliding of the seat 60, the winding portion 32 rotates to the side of the moving direction of the wire harness 11 and the harness regulating portion 30, and the harness regulating portion 30 is wound by the winding portion 32 by the distance moved by the harness regulating portion 30. In the present embodiment, since the harness regulating portion 30 is in a wound state in the natural state, it is held in the wound state with respect to the outer peripheral surface of the tubular portion 33 without using a fixing means. It should be noted that the relationship between the harness regulating portion 30 and the winding portion 32 is not limited to this, and for example, the end portion of the harness regulating portion 30 may also be fixed to the tubular portion 33 through a fixing means such as welding or adhesion.

Figure 7:
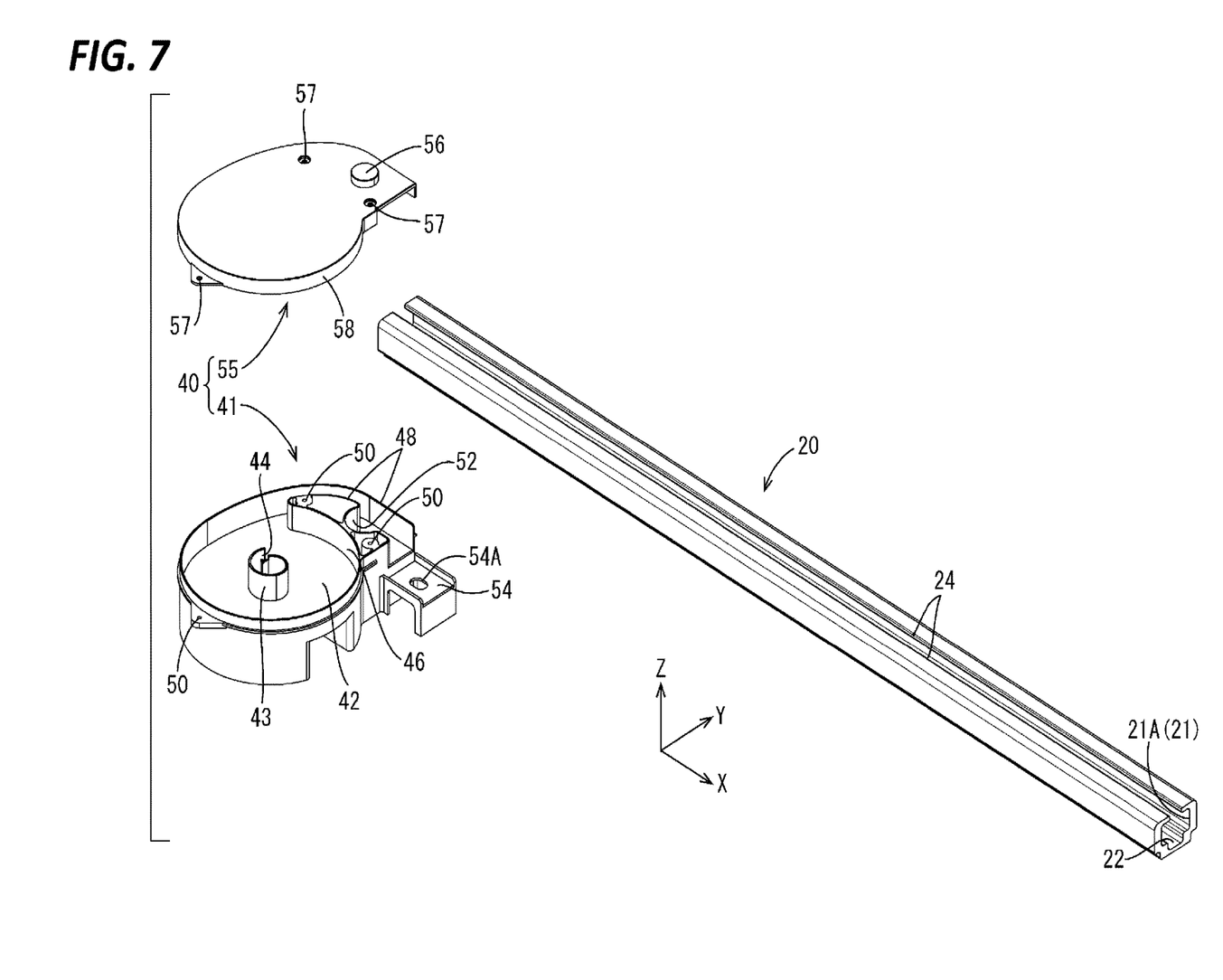
FIG. 7 is an exploded perspective view of the rail and an extra-length accommodation portion.

The extra-length accommodation portion 40 accommodates the extra length portion 11A of the wire harness 11 that is not accommodated in the rail 20, and includes an accommodation portion main body 41 and a lid portion 55 as shown in FIG. 7. The accommodation portion main body 41 includes a flat plate-shaped bottom surface portion 42, an accommodation wall 46 inside of which the wire harness 11 is accommodated in a spiral shape, and a guide wall 48 for guiding the wire harness 11 into the accommodating wall 46. A lead-out portion 43 for leading the wire harness 11 to the floor, under the floor, or the like of the vehicle is formed in the middle portion of the bottom surface portion 42. The lead-out portion 43 has a tubular shape that rises from the edge portion of the through hole 42A (see FIG. 2) formed in the bottom surface portion 42, and as shown in FIG. 7, an insertion groove 44 into which the wire harness 11 is inserted has been cut out. The accommodating wall 46 rises in an annular shape from the bottom surface portion 42, and forms an accommodation space for the wire harness 11 between the lead-out portion 43 and the accommodation wall 46. The guide wall 48 guides the advancing direction of the wire harness 11 on the frontward side of the rail 20 in a direction bent toward the accommodation space in the accommodation wall 46 with respect to the front-rear direction. At a position adjacent to the outside of the accommodation wall 46, a plurality of (three in this embodiment) retaining portions 50 to which the lid portion 55 can be screwed are formed. A screw hole is formed in each retaining portion 50.

On the accommodation wall 46 side of the guide wall 48, a recessed wall 52 in which the winding portion 32 is rotatably accommodated is provided. In the recessed wall 52, a space in which the winding portion 32 is accommodated is ensured by cutting out the wall of the guide wall 48 in an arc shape. A rail fixing portion 54 is arranged below the bottom surface portion 42 rearward of the guide wall 48. The rail fixing portion 54 has an inverted U shape, and a fastening hole 54A through which the end portion of the rail 20 can be fastened with a bolt is formed through the upper surface portion. In a state in which the rail 20 is fixed on the rail fixing portion 54, the inner wall (hole wall) of the insertion hole 21 of the rail 20 is continuous with the inner surface of the guide wall 48 and the upper surface of the bottom surface portion 42.

The lid portion 55 has a flat plate shape corresponding to the shape of the accommodation portion main body 41, a protrusion 56 protruding upward in a circular shape is formed at a position corresponding to the winding portion 32 in the lid portion 55, and a circular recess (not shown) into which the upper end portion of the winding portion 32 fits is formed on the lower surface side of the protrusion 56. A plurality of screw holes 57 through which shaft portions of screws for screwing to the retaining portions 50 of the accommodation portion main body 41 can be inserted are formed through the lid portion 55. A peripheral wall 58 that covers the outside of the upper end portion of the accommodation portion main body 41 is formed on the peripheral edge portion of the lid portion 55.

Next, operations performed when the seat 60 is slid will be described.

When the seat 60 is on the rearward side of the rail 20 (the state shown in FIG. 2), the band-shaped harness regulating portion 30 is in a state of extending linearly in the rail 20. As shown in FIG. 3, the harness regulating portion 30 in this state is arranged between the inner wall of the rail 20 and the harness regulating portion 30, and therefore positional misalignment of the routing path of the wire harness 11, falling over of the wire harness 11, and the like are regulated by the harness regulating portion 30. Also, since the harness regulating portion 30 in this state is deformed from the natural state, an elastic repulsive force (toward the hole wall 21A side on the lateral side of the insertion hole 21) is generated, and if the routing path is bent due to flexure or the like occurring in the wire harness 11, the harness regulating portion 30 comes into contact with the wire harness 11 and the wire harness 11 can be held between the hole wall 21A on the lateral side of the insertion hole 21 and the harness regulating portion 30.

Next, when the user slides the seat 60 frontward, the slider 26 and the wire harness 11 slide frontward, and the harness regulating portion 30 in the rail 20 slides frontward (the state in FIG. 4). At this time, the harness regulating portion 30 led out to the front of the rail 20 is wound by the rotating winding portion 32 and is wound while being elastically restored (see FIG. 6).

Next, when the user slides the seat 60 rearward from this state, the slider 26 and the wire harness 11 slide rearward, and the harness regulating portion 30 in the rail 20 slides rearward (the state in FIG. 2). At this time, the harness regulating portion 30 on the frontward side of the rail 20 is rewound while being elastically deformed by the winding portion 32 rotating on the opposite side, and is in a linearly extended state.

According to this embodiment, the following operations and effects are exhibited.

According to the present embodiment, a wire harness routing device 10 includes a rail 20 in which an insertion hole 21 through which a wire harness 11 is to be inserted is formed, and a slider 26 configured to perform a sliding movement together with the wire harness 11 with respect to the rail 20, the wire harness routing device 10 including a harness regulating portion 30 that is arranged along the wire harness 11 in the insertion hole 21, regulates the movement of the wire harness 11 in a direction different from the front-rear direction (direction of performing the sliding movement), and moves in the insertion hole 21 accompanying the sliding movement of the slider 26.

According to the present embodiment, the harness regulating portion 30 can regulate the routing path of the wire harness 11 in the rail 20. Also, since the harness regulating portion 30 moves in the insertion hole 21 accompanying the movement of the slider 26, it is possible to suppress a case in which the harness regulating portion 30 becomes an obstacle to the movement of the slider 26.

Also, the harness regulating portion 30 is elastically deformable in response to the movement of the slider 26, and an end portion of the harness regulating portion 30 is fixed to the slider 26 side.

By doing so, with a simple configuration, it is possible to regulate the routing path of the wire harness 11 while preventing the harness regulating portion 30 from becoming an obstacle to the movement of the slider 26 due to elastic deformation.

Also, a winding portion 32 for winding the harness regulating portion 30 is provided outside of the rail 20.

By doing so, the harness regulating portion 30 can be accommodated outside of the rail 20 with a simple configuration.

Also, an extra-length accommodation portion 40 in which the extra length portion 11A of the wire harness 11 led out to the outside of the rail 20 is accommodated is provided, and the wire harness 11 is wound in a spiral shape with two or more turns in the extra-length accommodation portion 40.

By doing so, the wire harness 11 is accommodated in the extra-length accommodation portion 40 in a spiral shape, and therefore, for example, it is possible to shorten the length of the extra-length accommodation portion 40 compared to a configuration in which the wire harness 11 is accommodated in a long accommodation box in a state of being folded over in a U shape.

Also, the wire harness 11 includes a plurality of electric wires 12 and an outer body 14 for accommodating the plurality of electric wires 12, the outer body 14 is inserted through the rail 20 in an orientation in which the vertical direction is longer than the width direction, and thus the harness regulating portion 30 suppresses the wire harness 11 from falling over.

If the wire harness 11 is inserted into the rail 20 in an orientation in which the vertical direction is longer than the width direction, the outer diameter of the portion where the path of the wire harness 11 bends can be reduced and a smaller size can be achieved compared to the configuration in which the vertical direction is shorter than the width direction, but there is a problem in that the wire harness 11 will have a vertically elongated shape and easily fall over. According to the present embodiment, even if a configuration is used in which falling over is likely to occur due to the orientation of the wire harness 11 for achieving a smaller size, the harness regulating portion 30 can suppress the wire harness 11 from falling over.

Other Embodiments

The technique described in the present specification is not limited to the embodiments described in the above description and the drawings, and for example, the following embodiments are also included in the technical scope of the technique described in the present specification.

(1) The number of turns of the wire harness 11 in the extra-length accommodation portion 40 is not limited to the number of turns of the above embodiment, and may be a different number of turns. Also, the number of turns in the extra-length accommodation portion 40 before and after the sliding of the slider 26 is not limited to the configuration in which the number of turns changes according to the position (position in the slide direction) of the seat 60 or the slider 26, and it is also possible to use a configuration in which the number of turns does not change depending on the position of the seat 60 or the slider 26 (a configuration in which only the interval between adjacent wire harnesses 11 in the spiral wire harness 11 changes).

(2) The harness regulating portion 30 was an elastic body, but there is no limitation to this. For example, the harness regulating portion may also be made of resin or fiber.

(3) The winding portion 32 may also be arranged at a different position. For example, the front end side of the harness regulating portion may be fixed to the rail 20, and a winding portion 32 that can rotate may be fixed to the rear end side (slider 26 side) of the harness regulating portion.

(4) The number of electric wires 12 included in the wire harness 11 is not limited to the number of the above-described embodiment, and can be changed to various numbers. For example, the wire harness 11 may include one electric wire 12. Also, the outer body 14 that protects the electric wire 12 is not limited to the shape of the above embodiment, and can be changed in various ways. Also, for example, the wire harness 11 may include only the electric wires 12 without using the outer body 14.

(5) The slider 26 is fixed to the seat 60 as a slid object, but the present invention is not limited to this. For example, the slider 26 may be fixed to a slide door with the slide door as the slid object.

LIST OF REFERENCE NUMERALS

10 Wire harness routing device
11 Wire harness
11A Extra length portion
12 Electric wire
14 Outer body
15 Outer main body
15A Notch
16 Outer cover
17 Guide member
17A Outer body fixing portion
17B Lead-out port
17C Extended attachment portion
17D Through hole
18A Insertion groove
18B Fixing member accommodation chamber
19 Fixing member
20 Rail
21 Insertion hole
21A Hole wall on lateral side
22 Bottom groove
24 Through groove
26 Slider
27 Slider main body
28 Attachment portion
30 Harness regulating portion
31 Metal fixing plate
31A Fixing hole
32 Winding portion
33 Tubular portion
34 Overhang portion
36 Support shaft portion
36A Head portion
40 Extra-length accommodation portion
41 Accommodation portion main body
42 Bottom wall portion
42A Through hole
43 Lead-out portion
44 Insertion groove
46 Accommodation wall
48 Guide wall
50 Retaining portion
52 Recessed wall
54 Rail fixing portion
54A Fastening hole
55 Lid portion
56 Protrusion
57 Screw hole
58 Peripheral wall
60 Seat

What is claimed is:

1. A wire harness routing device comprising
a rail in which an insertion hole through which a wire harness is to be inserted is formed;
a slider configured to perform a sliding movement together with the wire harness with respect to the rail; and
a harness regulating portion that is arranged along the wire harness in the insertion hole, and is configured to regulate movement of the wire harness in a direction different from the direction of performing the sliding movement, and move in the insertion hole accompanying the sliding movement of the slider,
wherein the harness regulating portion is a thin, elastically-deformable leaf spring,
a winding portion configured to wind the harness regulating portion is provided outside of the rail,
the harness regulating portion is elastically deformable in response to the movement of the slider, and
an end portion of the harness regulating portion is fixed to a side of the slider.

2. The wire harness routing device according to claim 1, comprising
an extra-length accommodation portion in which an extra length portion of the wire harness led out to the outside of the rail is accommodated,
wherein the wire harness is wound in a spiral shape with two or more turns in the extra-length accommodation portion.

3. The wire harness routing device according to claim 1, wherein the wire harness includes a plurality of electric wires and an outer body for accommodating the plurality of electric wires, and the outer body is inserted through the rail in an orientation in which a vertical direction is longer than a width direction, and
the harness regulating portion suppresses the wire harness from falling over.

4. The wire harness routing device according to claim 1, wherein the harness regulating portion is bent with a constant curvature in a natural state, and a return force generated when the harness regulating portion is stretched in a straight line is constant.

5. A wire harness routing device comprising
a rail in which an insertion hole through which a wire harness is to be inserted is formed;

a slider configured to perform a sliding movement together with the wire harness with respect to the rail;

a harness regulating portion that is arranged along the wire harness in the insertion hole, and is configured to regulate movement of the wire harness in a direction different from the direction of performing the sliding movement, and move in the insertion hole accompanying the sliding movement of the slider; and an extra-length accommodation portion in which an extra length portion of the wire harness led out to the outside of the rail is accommodated, wherein the harness regulating portion is a thin, elastically-deformable leaf spring, a winding portion configured to wind the harness regulating portion is provided outside of the rail, and the wire harness is wound in a spiral shape with two or more turns in the extra-length accommodation portion.

* * * * *